(12) United States Patent
Motta

(10) Patent No.: US 8,587,682 B2
(45) Date of Patent: Nov. 19, 2013

(54) DISPLAY SYSTEM, METHOD, AND COMPUTER PROGRAM PRODUCT FOR CAPTURING IMAGES USING MULTIPLE INTEGRATED IMAGE SENSORS

(75) Inventor: Ricardo J. Motta, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 181 days.

(21) Appl. No.: 13/026,238

(22) Filed: Feb. 12, 2011

(65) Prior Publication Data

US 2011/0199497 A1   Aug. 18, 2011

Related U.S. Application Data

(60) Provisional application No. 61/304,365, filed on Feb. 12, 2010.

(51) Int. Cl.
*H04N 5/225* (2006.01)
*H04N 15/00* (2006.01)
*H04N 5/222* (2006.01)

(52) U.S. Cl.
USPC ............. 348/218.1; 348/56; 348/333.12

(58) Field of Classification Search
USPC .............. 348/218.1, 36–39, 333.11, 333.12
See application file for complete search history.

(56) References Cited

U.S. PATENT DOCUMENTS

| | | | |
|---|---|---|---|
| 5,340,978 A | 8/1994 | Rostoker et al. | |
| 2006/0007222 A1 | 1/2006 | Uy | |
| 2007/0120879 A1 | 5/2007 | Kanade et al. | |
| 2007/0263076 A1* | 11/2007 | Andrews et al. | 348/14.08 |
| 2008/0088553 A1* | 4/2008 | Yokodate et al. | 345/84 |
| 2008/0106629 A1 | 5/2008 | Kurtz et al. | |
| 2008/0278791 A1* | 11/2008 | De Vaan | 359/245 |
| 2008/0316329 A1* | 12/2008 | Kim et al. | 348/222.1 |
| 2009/0102763 A1* | 4/2009 | Border et al. | 345/87 |
| 2010/0295860 A1* | 11/2010 | Somerville et al. | 345/545 |

OTHER PUBLICATIONS

Extended European Search Report from European Patent Application No. 11001188.9, dated Oct. 5, 2012.

* cited by examiner

*Primary Examiner* — Lin Ye
*Assistant Examiner* — Mekonnen Dagnew
(74) *Attorney, Agent, or Firm* — Zilka-Kotab, PC

(57) ABSTRACT

A display system, method, and computer program product are provided for capturing images using multiple integrated image sensors. The display system includes a front panel for displaying an image. The display system further includes a matrix of image sensors situated behind the front panel.

22 Claims, 8 Drawing Sheets

DISPLAY SYSTEM, METHOD, AND COMPUTER PROGRAM PRODUCT FOR CAPTURING IMAGES USING MULTIPLE INTEGRATED IMAGE SENSORS

RELATED APPLICATION(S)

The present application claims the priority of a previously filed provisional application filed Feb. 12, 2010 under Ser. No. 61/304,365, which is incorporated herein by reference in its entirety.

FIELD OF THE INVENTION

The present invention relates to display systems, and more particularly to display systems with image capturing capabilities.

BACKGROUND

Image sensors are increasingly being used in conjunction with displays to enable many new applications. Examples of these application include (a) video conferencing, where the user transmits an image of itself while looking at the image of a remote user, (b) user interfaces, where the user gesticulates as a way of controlling the display contents (e.g. changing channels in a TV), (c) head tracking, where the position of the head is used to modify the display content in a computer user interface, or for stereo viewing in auto-stereoscopic displays, and (d) environmental control, where the display might change the contents or its operation in response to changes on the ambient illumination, viewer position and number of viewers.

In one traditional implementation, an image sensor has been placed in close proximity to the edge of the display, usually in its bezel, at the top. Unfortunately, there are many limitations resulting from this placement of the image sensor. For example, the usefulness of such camera/image sensor systems is limited by the excessive parallax when the user viewing position is close to the display surface, as in a desktop computer display, or when the displays are very large.

In another traditional implementation, telepresence systems have been customized to include large displays providing real size images of participants, and are placed far from the users to minimize the parallax. Unfortunately, other factors that greatly influence the quality of the teleconference are the delay, and image quality including resolution and color matching. In yet another implementation, to achieve eye-to-eye communication, several devices have been proposed and described, including the use of beam splitters in a teleprompter like configuration, or embedding of the camera behind the display.

Several limitations are associated with the aforementioned implementations traditionally utilized, including 1) Fixed Point of View (POV)—the image of the local user can only be captured from one point-of-view, fixing also the placement of the image of the remote user on the display to coincide with the camera POV; 2) Fixed Field of View (FOV)—the view is fixed because the camera or cameras behind the display cannot change focal length with respect to the local user position—this restricts the user to a single correct viewing position, with the image becoming increasingly distorted away from it; and 3).

Bulk size—the size of a typical high quality camera, and the FOV requirement for a natural image, will require the camera to be removed back from the viewing surface, greatly increasing the bulk of the display device and making any such method impractical for use in laptop displays, cell phones and other apparatus where the thickness of the display should remain small.

There is thus a need for addressing these and/or other issues associated with the prior art.

SUMMARY

A display system, method, and computer program product are provided for capturing images using multiple integrated image sensors. The display system includes a front panel for displaying an image. The display system further includes a matrix of image sensors situated behind the front panel.

DETAILED DESCRIPTION

Figure 1:
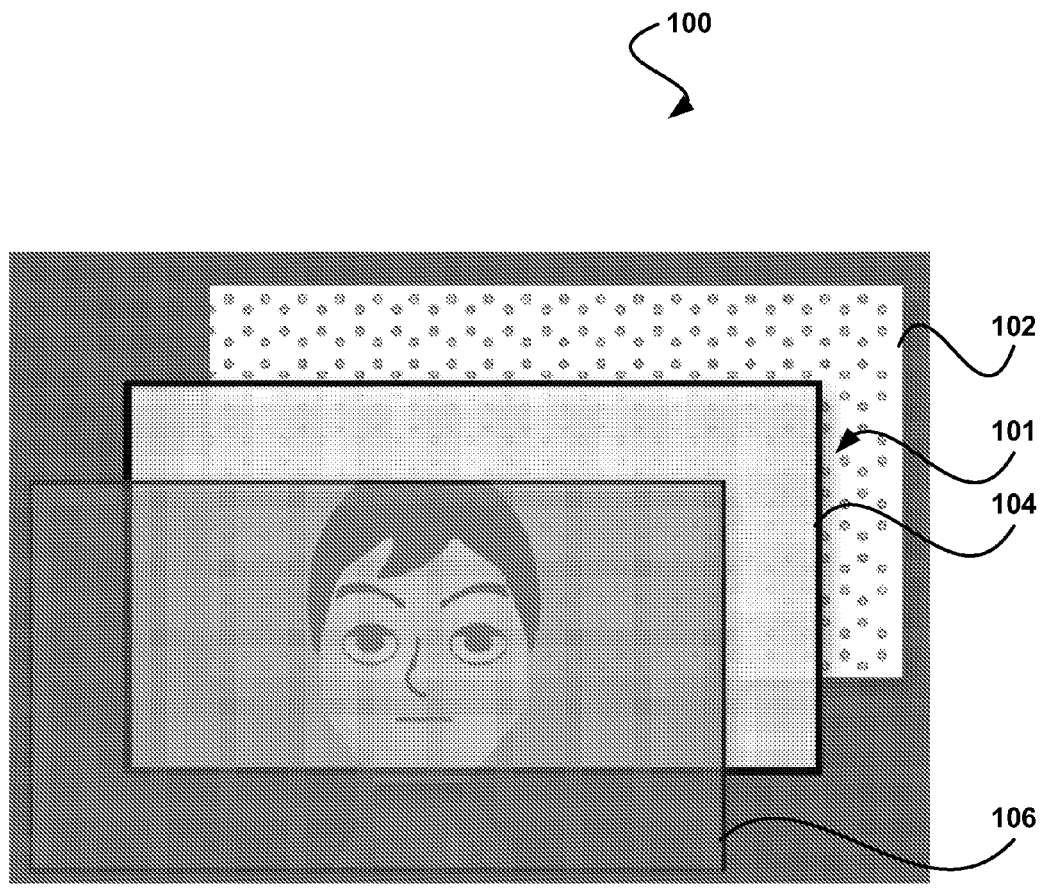
FIG. 1 shows a display system for capturing images using multiple integrated image sensors, in accordance with one embodiment.

FIG. 1 shows a display system 100 for capturing images using multiple integrated image sensors, in accordance with one embodiment. With respect to the present description, the display system 100 may include any type of display system capable of being configured in the manner described with respect to FIG. 1. For example, the display system 100 may include a flat panel display system.

It should be noted that while in the present embodiment the display system 100 is described as liquid crystal display (LCD) system, other embodiments are contemplated in which the display system 100 may include a fluorescent glass display system, an active matrix organic light emitting diode (AMOLED) display system, etc. Examples of the implementation with respect to the fluorescent glass display system and AMOLED display system are described in more detail with respect to the description of the figures below.

As shown, the display system 100 includes a front panel 106 for displaying an image. The front panel 106 may include an LCD panel, in one embodiment. For example, the front panel 106 may include a transparent color LCD panel. As another example, the front panel 106 may include a thin film transistor (TFT) LCD panel. Of course, however, the front panel 106 may include any apparatus capable of displaying an image for viewing by a user.

As also shown, the display system 100 further includes a matrix of image sensors 101 situated behind the front panel 106. The matrix may include an ordered two-dimensional array of image sensors 101, in one embodiment. In another embodiment, the matrix may include an unordered set of image sensors 101 (i.e. not necessarily positioned any particular order).

The image sensors 101 may include any sensors capable of capturing an image (e.g. of a scene in front of the front panel 106), with respect to the present description. For example, the image sensors may each include a camera module, such as the cameras traditionally used in mobile telephones. Accordingly, each image sensor may have an individual lens for capturing the image.

To this end, a matrix of image sensors 101 may be positioned behind the front panel 106 utilized for displaying a first image, such that the matrix of sensors 101 may capture a second image through the front panel 106, as described in more detail below. By utilizing a plurality of image sensors 101 to capture the image, the image may be captured according to a plurality of different points of view (i.e. specific to each of the image sensors 101). Such different points of view may then be utilized to generate an image for display that is specific to a point of view of the user (i.e. where the user is looking from) to which the generated image is to be displayed.

As noted above, the display system 100 includes a matrix of image sensors 101 which are positioned behind the front panel 106 utilized for displaying an image. For example, a stack of elements may be utilized to construct the aforementioned display system, including the front panel 106 and a back panel 102 on which the image sensors 101 may be located. Also included in the stack of elements may be a shutter 104 (e.g. an LCD shutter) situated between the front panel 106 and the image sensors 101 (i.e. the back panel 102 on which the image sensors 101 are positioned). One example of the shutter 104 may be the Fast Optical Shutter Polymer Stabilised Cholesteric Textured (FOS-PSCT) liquid crystal shutter made by LC-Tec displays of Borlange, Sweden. This type of shutter 104 can be made in large sizes and may switch between a diffuse state (i.e. voltage off) and a transparent state (i.e. voltage on) in less than one millisecond.

In one embodiment, the back panel 102 on which the image sensors 101 are positioned may further include a plurality of light emitting diodes (LEDs) for displaying the image. For example, the image sensors 101 may be interspersed among the LEDs. As an option, the LEDs may be configured in a matrix on the back panel 102, such that lattices (i.e. columns and rows of the back panel 102) exist between the LEDs. Just by way of example, the LEDs may be spaced so that the combination of each LED point spread function (PSF) and the PSF of the shutter 104 may result in uniform backlight illumination. A hexagonal lattice may be utilized to provide uniformity for when the PSF is circular in both the shutter 104 and LED, but of course different arrangements are possible.

As a further option, the image sensors 101 may occupy positions in at least a portion of the lattices existing between the LEDs. It should be noted, however, that the image sensors 101 may not necessarily occupy every position within the lattices existing between the LEDs.

Further, as noted above, the shutter 104 may be operable in a diffuse state and a transparent state. In the diffuse state, the shutter 104 may be operable to diffuse an illumination provided by the LEDs. Thus, the diffused illumination may be received by the front panel 104 for displaying the image. In the transparent state, the shutter 104 may be operable to allow the image sensors 101 to capture an image through the front panel 106.

Thus, the image sensors 101 may be operable to capture the image when the shutter 104 is in the transparent state. In one embodiment, the image sensors 101 may be synchronized, such that the image sensors 101 simultaneously capture the image. Optionally, a controller (not shown) of the display system 100 may be utilized to synchronize the image sensors 101 to capture the image through the front panel 106.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
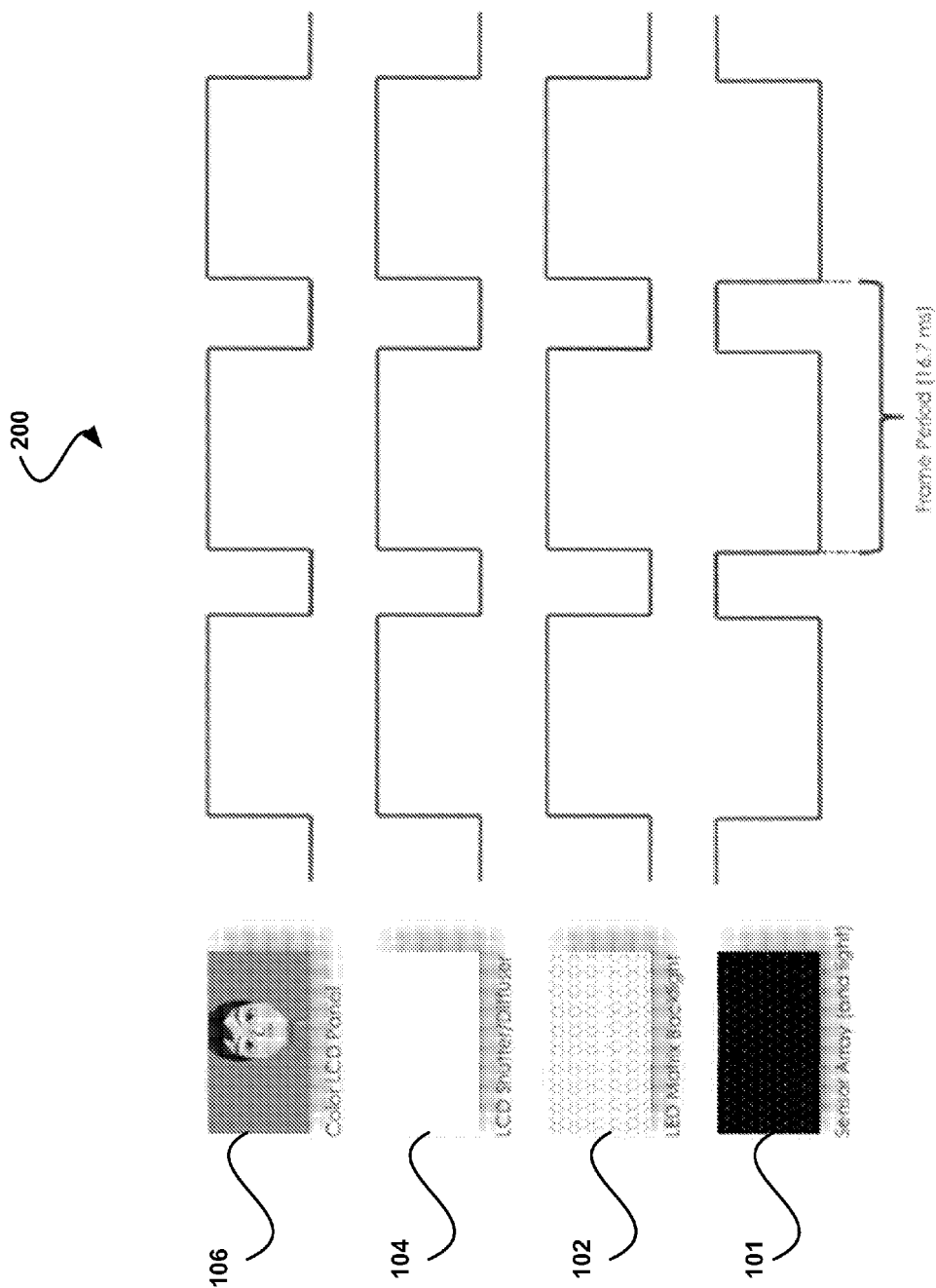
FIG. 2 shows a timing diagram for the display system of FIG. 1, in accordance with another embodiment.

FIG. 2 shows a timing diagram 200 for the display system of FIG. 1, in accordance with another embodiment. As an option, the timing diagram 200 may be implemented with respect to the display system 100 of FIG. 1. Of course, however, the timing diagram 200 may be implemented in any desired environment. It should also be noted that the aforementioned definitions may apply during the present description.

In operation, the display system 100 operates by alternating between two states, namely a display state and a camera state. In the display state (i.e. during display of a frame), the front panel 106 shows an image (e.g. such as that of a remote user in the case of a tele-presence application), the LEDs situated on the back panel 102 are turned on, and the shutter 104 is in the diffuse state, providing uniform illumination to the front panel 106. Optionally, the LEDs may be turned on only where required by the image content. This scheme, called local LED dimming, may increase a dynamic range of the displayed image while saving power.

In the camera state, the front panel 106 becomes transparent (e.g. as if showing a white image) or dark depending on the technology of the front panel 106, the shutter 104 also goes into the transparent state (i.e. a voltage is applied in the case of the LC-Tec shutter), and the LEDs are all turned off. In this state, the image sensors 101 on the back panel can see the scene in front of the front panel 106, such as a user situated in front of the display system 100 for viewing the image displayed on the display system 100. If the structures in front of the image sensors 101 (i.e. the shutter 104 and front panel 106) cannot be made completely clear for allowing the image sensors 101 to capture the image, resulting residual artifacts [e.g. as flare and fixed pattern noise (FPN)] in the image may be removed during operation by image processing using off-line characterization data.

In one embodiment, each image sensor 101 may capture the image while the display system 100 is in the camera state. Thus, images may be captured through the front panel 106 at the regular intervals between display frames. For example, in response to identification of a transparent state of the front panel 106, a plurality of images may be captured utilizing the image sensors 101 situated behind the front panel 106.

In another embodiment, other sensors on the back panel 102 may operate during the display state, such as infrared (IR) sensors used to detect touch or proximity to the front panel 106 and ambient light sensors. As an option, while the display system 100 is in the camera state, auxiliary illumination (e.g. white LEDs placed on a bezel of the display system 100) may be turned on. The auxiliary illumination may be utilized for (a) providing illumination to aid exposure levels, (b) to aesthetically improve the appearance of the image being captured, (c) to create a sense of continuous space in tele-presence applications, (d) to provide structured illumination for 3-dimensional (3D) position sensing and coding, and/or (e) for reflectance field acquisition.

As described above, the display of a first image via the LEDs of the back panel 102, the shutter 104, and the front panel 106 of the display device (i.e. the display state), and the capturing of a second image by the image sensors 101 of the display device (i.e. the camera state) may be interleaved. In one embodiment, the display of the first image via the LEDs of the back panel 102, the shutter 104, and the front panel 106 of the display device and the capturing of the second image by the image sensors 101 of the display device may be interleaved at video rates due to the ability of the components 101-106 of the display device to switch on and off at high rates. This may therefore minimize or make invisible any flickering resulting from the switching between the display state and the camera state.

To offset any loss of brightness due to reduction on the illumination duty cycle, the LEDs of the back panel 102 may be operated at a proportionally higher voltage during the display state. To enhance the contrast and minimize interference of the image displayed on the front panel 106, an exposure interval of the image sensors 101 (i.e. the camera state) may be limited to a period of time when the front panel 106 and shutter 104 are transparent and the LEDs on the back panel 102 are tuned off. Examples of image sensors capable of operating in the aforementioned manner include interline transfer charge-coupled devices (CCDs), and complementary metal-oxide-semiconductor (CMOS) sensors with fast readout, or CMOS sensors with sample and hold circuits.

Figure 3A:
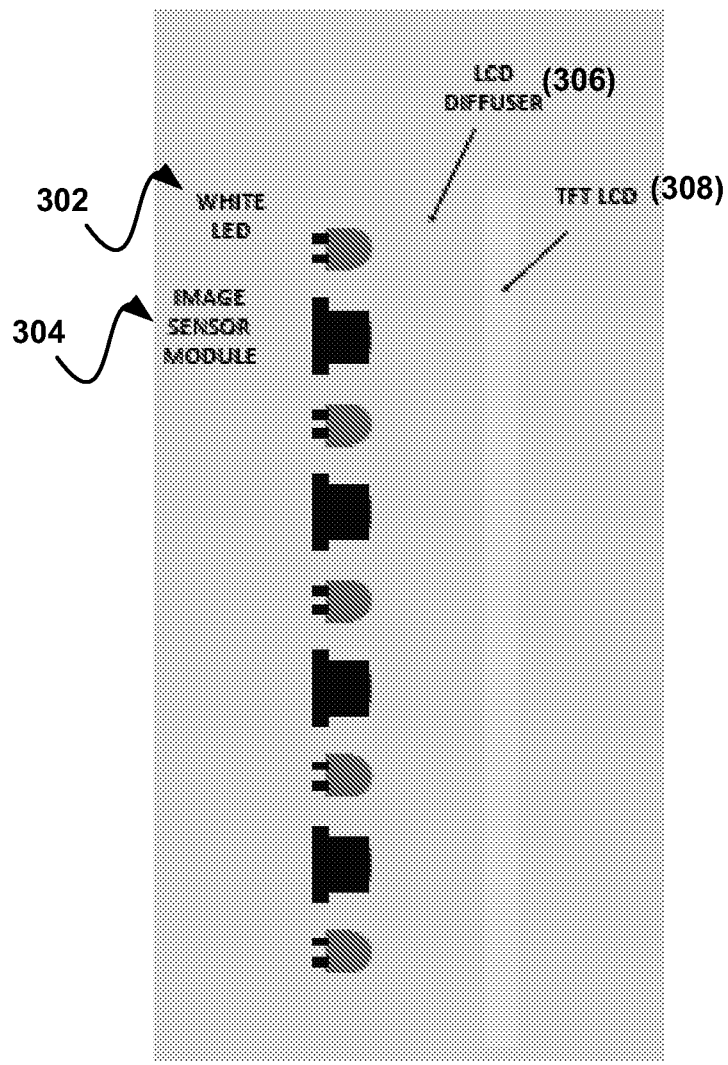
FIG. 3A shows a configuration of a liquid crystal display system for capturing images using multiple integrated image sensors, in accordance with yet another embodiment.

FIG. 3A shows a configuration of a liquid crystal display system for capturing images using multiple integrated image sensors, in accordance with yet another embodiment. As an option, the present system may be implemented in the context of the functionality and architecture of FIGS. 1-2. Of course, however, the system may be implemented in any desired environment. Again, it should be noted that the aforementioned definitions may apply during the present description.

As shown, the liquid crystal display system includes LEDs 302 for illuminating an image on a TFT LCD panel 308. An LCD diffuser 306 (i.e. shutter) diffuses the illumination provided by the LEDs such that the diffused illumination is provided to the TFT LCD panel 308. Image sensor modules 304 are interleaved with the LEDs 302, such that when the LEDs 302 are in an off state, the LCD diffuser 306 is transparent, and as a result the TFT LCD panel 308 is transparent, the image sensor modules 304 may have a view through the LCD diffuser 306 and the TFT LCD panel 308 for capturing an image in front of the TFT LCD panel 308.

Figure 3B:
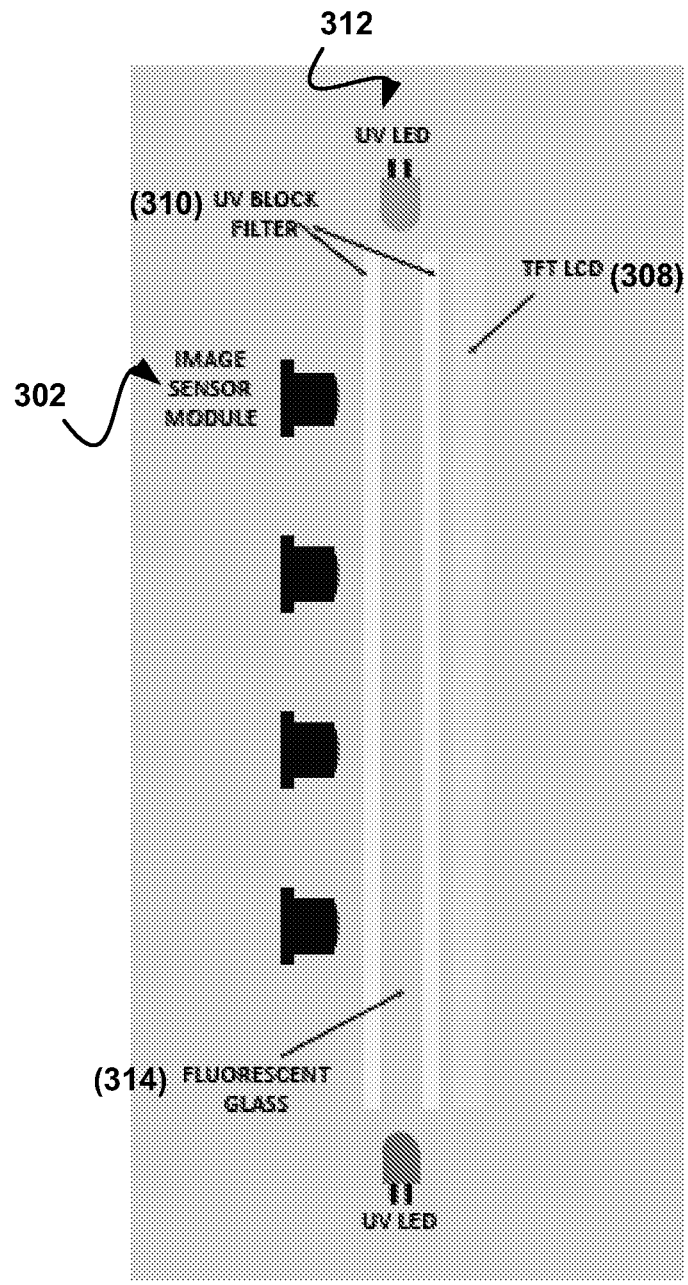
FIG. 3B shows a configuration of a fluorescent glass display system for capturing images using multiple integrated image sensors, in accordance with yet another embodiment.

FIG. 3B shows a configuration of a fluorescent glass display system for capturing images using multiple integrated image sensors, in accordance with yet another embodiment. As an option, the present system may be implemented in the context of the functionality and architecture of FIGS. 1-2. Of course, however, the system may be implemented in any desired environment. Again, it should be noted that the aforementioned definitions may apply during the present description.

As shown, the fluorescent glass display system includes a front panel (shown as TFT LCD panel 308) for displaying an image. The image is provided to the TFT LCD panel 308 via illumination of fluorescent glass 314 by ultra-violet (UV) LEDs 312. A pair of UV block filters 310 are also included, one situated on a front side of the fluorescent glass 314 and one situated on a back side of the fluorescent glass 314.

In operation, the fluorescent glass display system changes between a display state and a camera state. Thus, also included are image sensor modules 304 situated behind the back side UV block filter 310, which are operable to capture an image of a scene in front of the TFT LCD panel 308 when the fluorescent glass display system is in the camera state. Specifically, when the UV LEDs 312 are in an off state, the UV block filters 310 are transparent as is the TFT LCD panel 308, such that the image sensor modules 304 may have a view through the UV block filters 310 and the TFT LCD panel 308 for capturing an image in front of the TFT LCD panel 308.

Figure 3C:
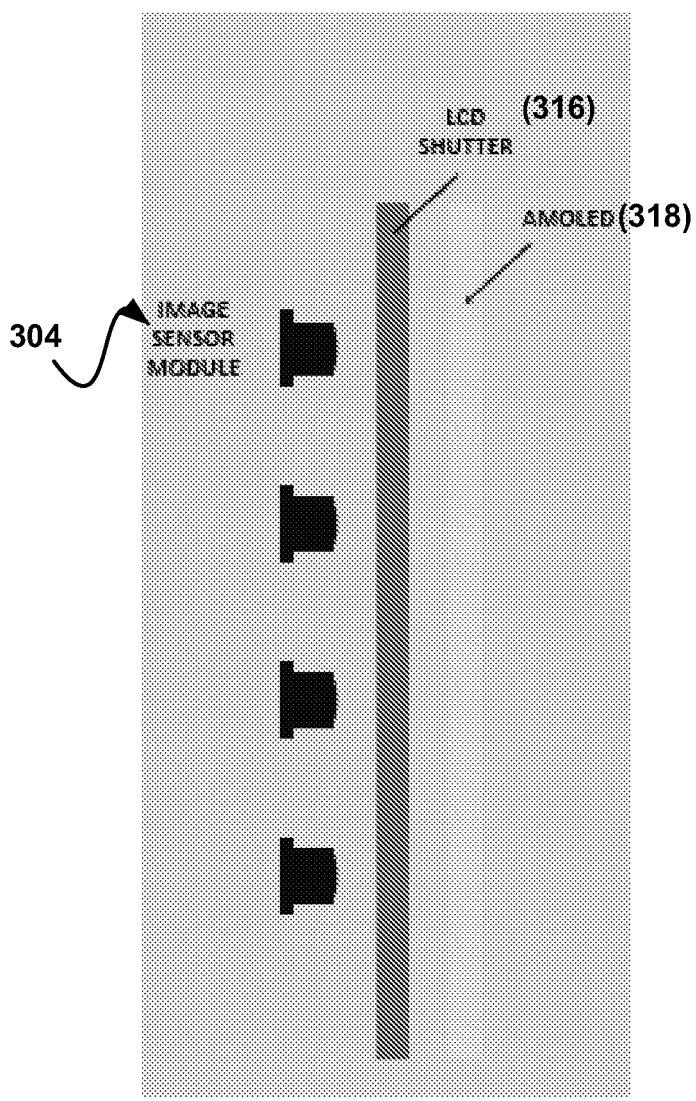
FIG. 3C shows a configuration of an active matrix organic light emitting diode (AMOLED) display system for capturing images using multiple integrated image sensors, in accordance with yet another embodiment.

FIG. 3C shows a configuration of an AMOLED display system for capturing images using multiple integrated image sensors, in accordance with yet another embodiment. As an option, the present system may be implemented in the context of the functionality and architecture of FIGS. 1-2. Of course, however, the system may be implemented in any desired environment. Again, it should be noted that the aforementioned definitions may apply during the present description.

The AMOLED display system includes a front panel (shown as an AMOLED 318) for displaying an image. An LCD shutter 316 is situated behind the AMOLED 318 for switching the AMOLED display system between a display state and a camera state. Because the AMOLED 318 is transparent and emits light in all direction, an optional LCD shutter 316 may be situated behind the AMOLED 318 to create a dark background when the AMOLED 318 is on, avoiding reflections from the array of image sensor modules 304. In the display state, the AMOLED is in an on state for displaying the image. In the camera state, the LCD shutter 316 and the AMOLED 318 are in an off state, such that the LCD shutter 316 and the AMOLED 318 are transparent for allowing the image sensor modules 304 to have a view through the LCD shutter 316 and the AMOLED 318 for capturing an image in front of the TFT LCD panel 308.

Figure 4:
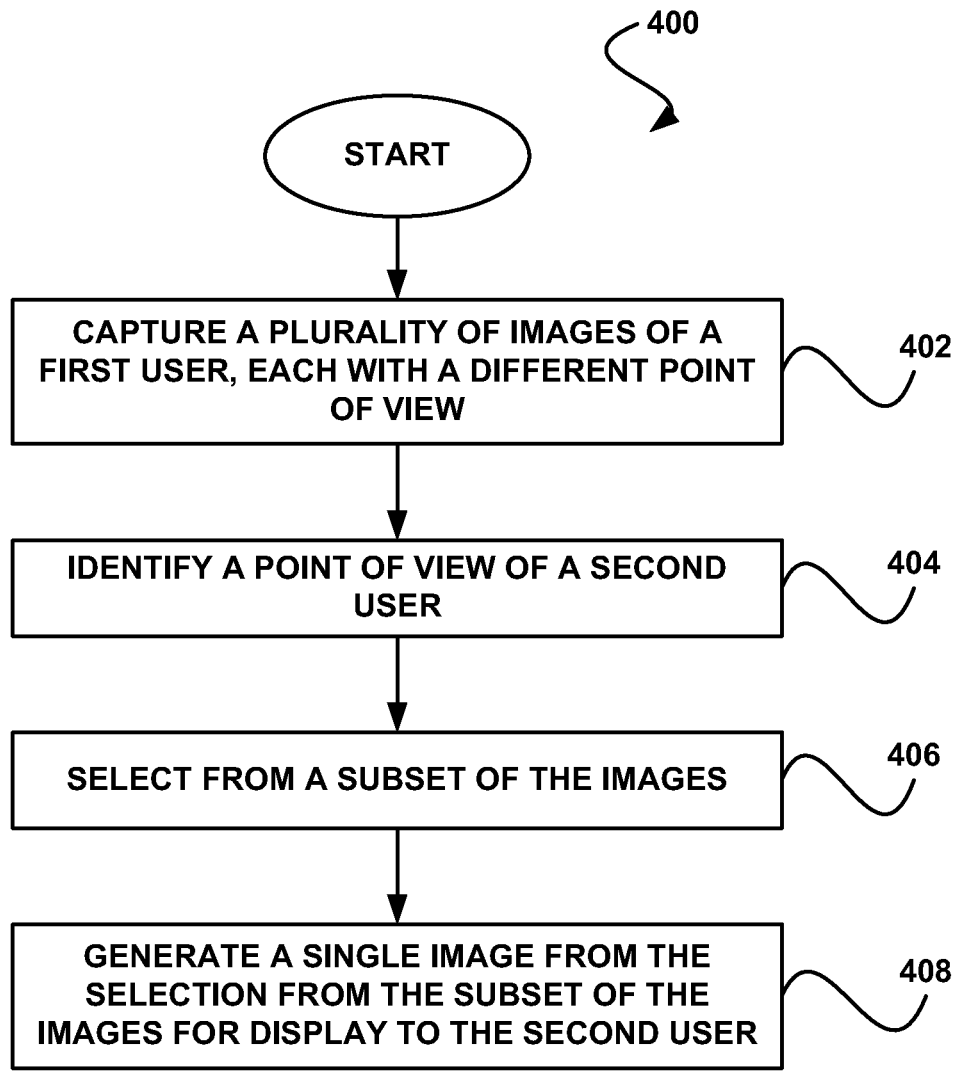
FIG. 4 shows a method for generating a single image using imaged captured from multiple integrated image sensors, in accordance with still yet another embodiment.

FIG. 4 shows a method 400 for generating a single image using images captured from multiple integrated image sensors, in accordance with still yet another embodiment. As an option, the present method 400 may be carried out in the context of the functionality and architecture of FIGS. 1-3C. Of course, however, the method 400 may be carried out in any desired environment. It should also be noted that the aforementioned definitions may apply during the present description.

As shown in operation 402, a plurality of images of a first user are captured, each with a different point of view. With respect to the present embodiment, the images are captured using a plurality of image sensors formed in a matrix behind a front panel of a display system. Each image represents a different point of view of a scene including the first user being captured (i.e. where the point of view is dependent on the location of the associated image sensor).

Global signals may be used to ensure uniform image quality among the captured images and synchronous operation of the image sensors. For example, shared image settings, including gain, exposure time and white balance, may be ensured as well as synchronization so that each capture performed by the image sensors starts and ends at the same time. Further, correction to or other processing of the captured images may optionally be performed.

Additionally, as shown in operation 404, a point of view (POV) of a second user is identified. The POV can be obtained in any one of a number of ways. In one embodiment, a position of the second user's eyes may be estimated from the images. In another embodiment, a matched remote system may be utilized which is capable of capturing the position of the second user's face and transmit the precise spatial location of the second user's eyes (e.g. in terms of x-coordinate, y-coordinate, z-coordinate), in other words, the second user's virtual POV.

Further, a selection is made from a subset of the images. Note operation 406. In the present embodiment, the subset of the images may range from a single one of the captured images to all of the captured images. In addition, such selection is made based on the POV of the second user, in the present embodiment. Specifically, the identified POV of the second user is used to determine from which image sensors the associated images are used, and how those images are combined, as described below.

In one embodiment, the POV of the second user may be used to determine which rays passing through each of the image sensors coincides with a virtual POV. The determined rays may then be used for assembling a desired image. For instance, rays passing horizontally through a middle image sensor of the front panel may correspond to pixels in the center of the image captured by the middle image sensor, while a ray passing through a lower image sensor may correspond to lower pixels in the image captured by the lower image sensor. Thus, the desired image may include a combination of pixels from the center of the image captured by the middle image sensor and the lower pixels in the image captured by the lower image sensor. In another embodiment, rays may be traced from the POV of the second user and through each image sensor, to identify one pixel for each image captured by the image sensors that has the correct value for the POV of the second user.

Still yet, as shown in operation 408, a single image is generated from the selection from the subset of the images for display to the second user. The final image is computed from the combination of all image sensors, overcoming the limitations of fixed POV, fixed focal length, size and image quality common to the prior art.

For example, the collection of identified pixels noted above may be used to generate the single image. Where the collection is too small to form the image at the desired resolution, interpolation between the pixels may be performed to generate the larger image.

To determine a mapping for unknown pixels of each image, a polygon mesh may be created by doing stereo triangulation between the points coincidental with the POV of the second user. For instance, for each image that has at least one pixel that is coincidental with the POV of the second user, it may be known exactly where that pixel maps to. Each image may also contain images of the neighboring points, but from a different POV. These points may be identified by auto-correlation, and the images may be distorted to the proper spacing between coincidental points. By linearly interpolating between corrected images, an approximation of a desired POV image may be obtained. The resulting generated image may be from a POV that corresponds to a second person placed behind the screen at a distance that would be comfortable for a conversation and eye contact.

By generating the single image from multiple of the captured images, each with the different POV, dynamic POV and dynamic focal length (i.e. change in focal length and axis with respect to the second user's head position) may be provided for the image, while allowing for varying size of the image and ensuring image quality in the manner described above. It should be noted that that the method 400 may be performed during each interval in which the display system is in a camera state. Furthermore, operations 404-408 may be performed in real-time, and thus may be reactive to changes in position of the second user. For example, each change in a POV of the second user may be identified in operation 404 such that the resulting image displayed to the second user may be based on the second user's current POV. This may achieve the continuous illusion to the second user of looking through a window.

It should be noted that while the present embodiment is described with respect to a two-dimensional (2D) image, 3D range information by triangulation between the image sensors may also be provided. The oversampling may allow high quality surface meshes to be built in both X and Y axis, which may be utilized for shape capture and relighting. The 3D capturing may also include capturing of user gestures in 3D for use in computer control. In another embodiment, the 3D capturing may include extraction of 3D shape information and texture for gaming. In yet another embodiment, a 3D image generated from the sensor images may be overlaid on another image (e.g. of a window or mirror) for providing an augmented reality user interface. In still yet another embodiment, a virtual scene (e.g. virtual cockpit of a car, military vehicle, airplane, etc.) may be generated using the 3D image.

In one exemplary embodiment, the method 400 may be used for head tracking, namely for adjusting the image of lenticular auto-stereoscopic displays which can provide stereo viewing of images without stereoscopic glasses. In another exemplary embodiment, the method 400 may be used with respect to a telepresence application, in which two systems are connected via high-speed communication link, and at least one system includes the system described above with respect to FIG. 1. For the system that includes the system described above with respect to FIG. 1, the POV of the user may be determined by its local system and transmitted to the remote system, or alternatively derived from the incoming remote image. To this end, face tracking on an incoming video stream may be provided for a teleconference.

The POV information can also be used to enhance the telepresence experience by determining the mouth and ear position for optimum sound capture and playback, and minimizing the background sound rejection. The range information obtained from triangulation can be used to enhance the privacy of the interaction, or the clarity of the image, by selectively blurring the background so that only the user stays in focus. As an option, external programmable illumination, such as on the bezel of the display system, may be used to generate illumination that matches that of the remote location, further increasing the telepresence realism.

In another exemplary embodiment in which there are two local viewers, the POV of both viewers may be measured and averaged to create a suitable point in between. In the case of several viewers, or a parallel arrangement like the telepresence rooms currently available with rows of tables parallel to a row of monitors, the POV may be placed at infinity, or to match the other system for best integration of heterogeneous systems.

If several individual users are in a teleconference, their images can be arrayed in many ways, for example, as if around a table. For each user several views may be generated from the same local system, each according to a requested POV, and requests POVs for the spatial desired arrangement. This system may also work if the local system generates a 4D light field "slab" that is transmitted to a server that negotiates and renders the requested views on demand. Optionally, integration of a single user system with a conventional multi-user telepresence system will be of higher quality because the size and POV of the single user system may be able to match that of the remote system.

Figure 5:
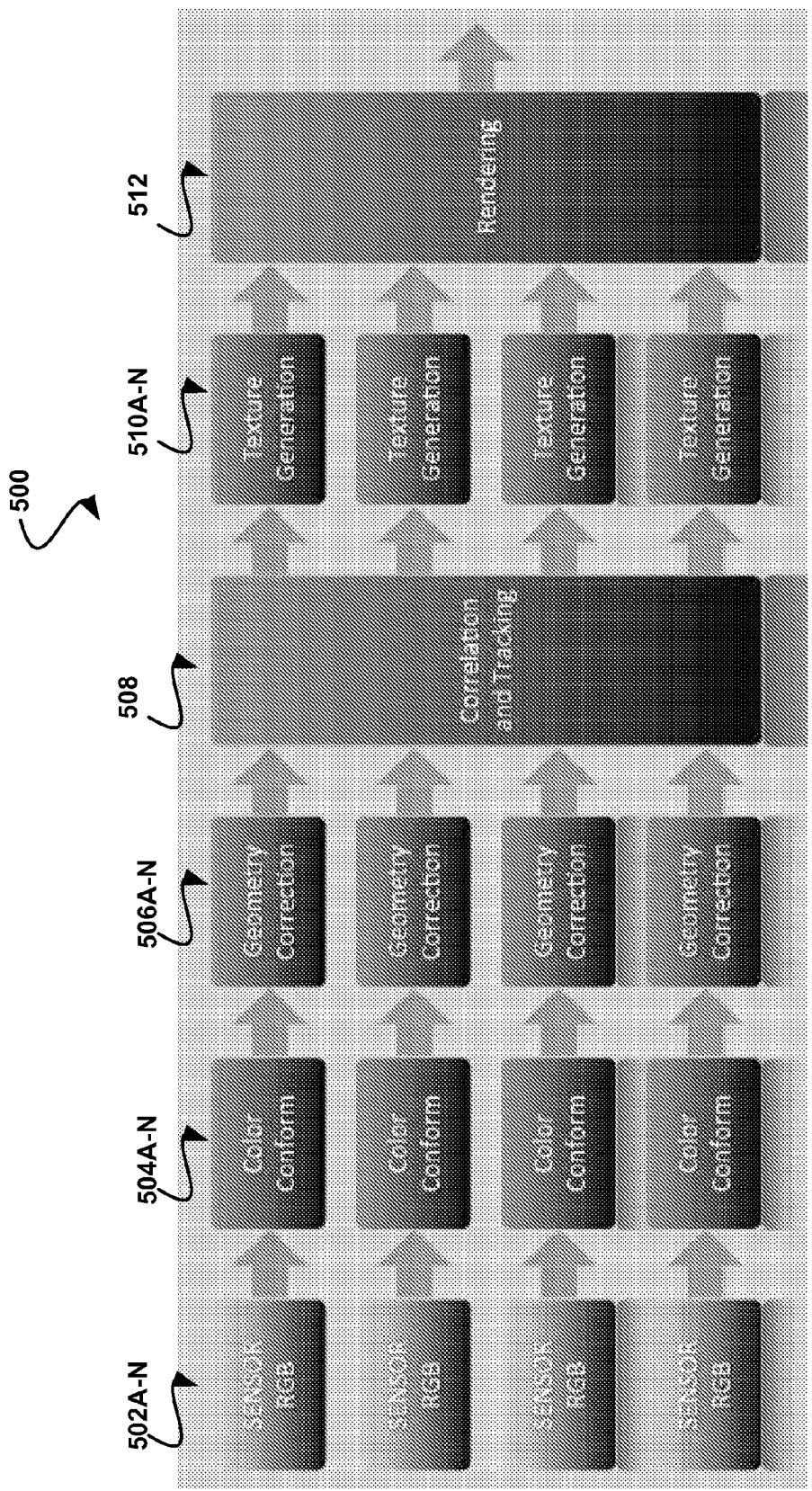
FIG. 5 shows a pipeline for implementing the method of FIG. 4, in accordance with another embodiment.

FIG. 5 shows a pipeline 500 for implementing the method of FIG. 4, in accordance with another embodiment. As an option, the pipeline 500 may be implemented in the context of the functionality and architecture of FIGS. 1-4. Of course, however, the pipeline 500 may be implemented in any desired environment. Again, it should be noted that the aforementioned definitions may apply during the present description.

As shown, the pipeline 500 includes a plurality of color sensors 502A-N. Each color sensor 502A-N is associated with a different image sensor of a display system. The color sensor 502A-N may determine the color of an image captured by the associated image sensor (e.g. in terms of red, green, and blue components).

The color determined by each color sensor 502A-N is then sent to an associated color conforming module 504A-N (i.e. specific to the image sensor). Since there may be variation between the image sensors, a conversion from raw sensor data captured by an image sensor to reconstructed color image may be performed by the color conforming module 504A-N using characterization data unique to each image sensor, such as defective pixel correction, fixed pattern noise (FPN) and dark signal non-uniformity (DSNU) correction, and any other processing that changes from sensor to sensor because of manufacturing or design variation, such as color matrixing due to variations in color filter design. The color conforming module 504A-N may obtain full color images where the pixel values, e.g. RGB, are related to the scene radiances the same way across the entire matrix of image sensors.

The reconstructed color image may be sent from each color conforming module 504A-N to an associated geometry correction module 506A-N (i.e. specific to the image sensor). The geometry correction module may correct geometries within the reconstructed color image. For example, the projection in space of each pixel (e.g. associated ray) may be identified so that the pixels from different images of different image sensors can be integrated. In one embodiment, this information may be identified by characterize each image sensor offline and storing the characterization data for use in real-time.

From the off-line characterization, a table may be created for each image sensor that indicates, given a pixel position and intensity as the input, the corresponding correct pixel position and intensity. The real time processing may be done using either the stored table and interpolating the values when required, or by creating and storing a parametric model for the sensor distortion and performing the calculations in real-time. Each sensor may be individually corrected so that any irregularities in sensor manufacturing and placement can be minimized. This may include rotation, barrel distortion, off-center axis, lateral chromatic magnification, cosine fall-off, and other artifacts.

Images resulting from the geometry correction module 506A-N are then sent to a single correlation and tracking module 508. The correlation and tracking module 508 selects from the received images based on a POV of a user to which a generated image is to be displayed, and further generates a single image using the selected subset. The generated image is sent to texture generation modules 410A-N for applying texture to the single image, and the textured single image is rendered for viewing by the user.

Figure 6:
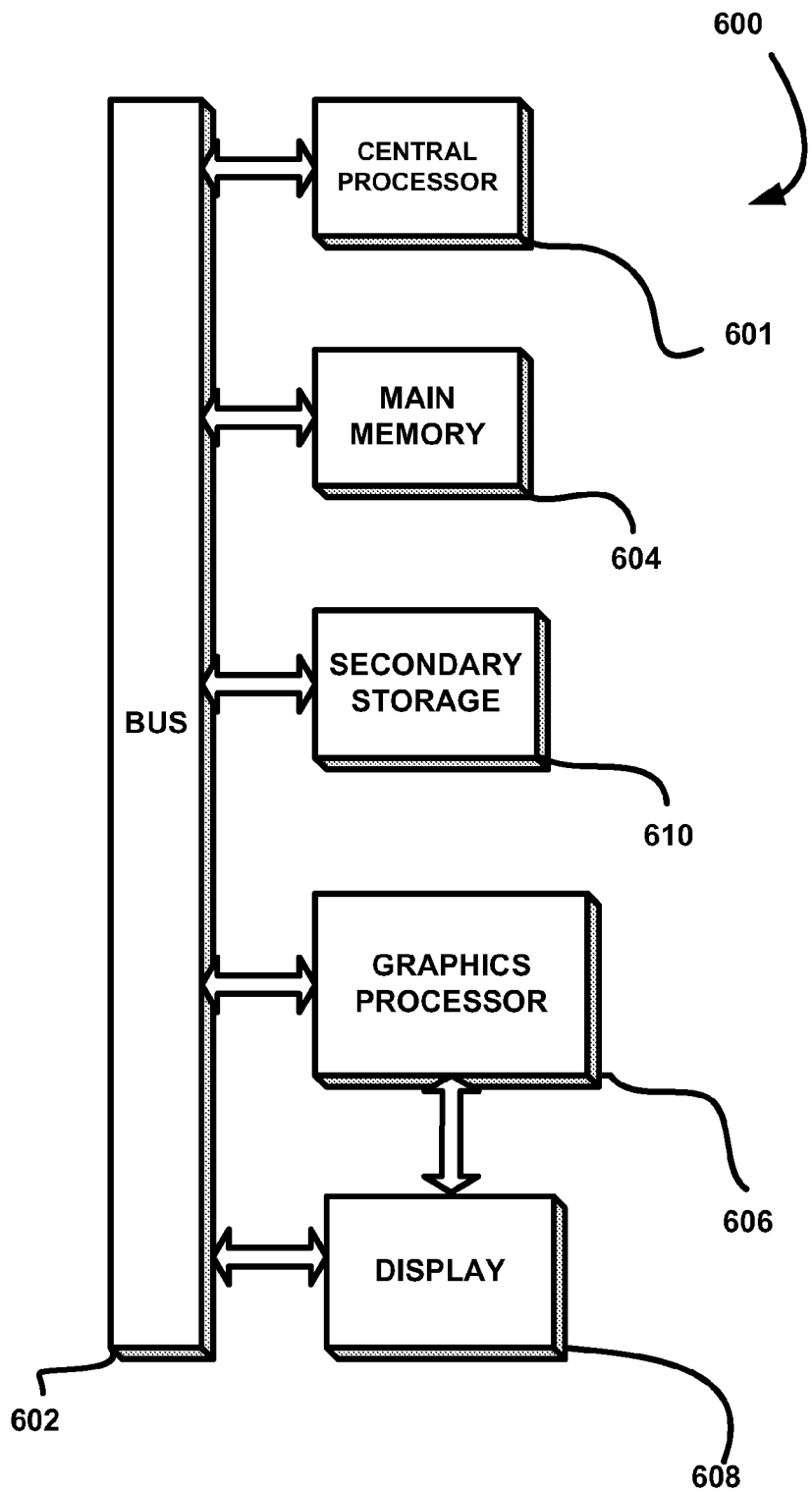
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices m including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A display apparatus, comprising:
a front panel for displaying an image to a first user situated in front of the front panel; and
a pipeline including:
a matrix of image sensors situated behind the front panel for capturing a plurality of images of the first user situated in front of the front panel, and
a correlation and tracking module which is adapted to:

identify a point of view of a second user to which a single final image of the first user to be generated based on the plurality of captured images is to be displayed, wherein the point of view of the second user is identified from a remote system capturing an image of the second user, trace rays from the point of view of the second user through each of the image sensors to identify pixels of the images captured by the image sensors that coincide with the point of view of the second user, and generate the single final image of the first user using the identified pixels for display to the second user, such that the single final image of the first user is specific to the point of view of the second user.

2. The display apparatus of claim 1, wherein the display apparatus includes a liquid crystal display (LCD) system.

3. The display apparatus of claim 1, wherein the display apparatus includes a fluorescent glass display system.

4. The display apparatus of claim 1, wherein the display apparatus includes an active matrix organic light emitting diode (AMOLED) display system.

5. The display apparatus of claim 1, wherein the front panel includes a transparent color liquid crystal display (LCD) panel.

6. The display apparatus of claim 1, wherein the front panel includes a thin film transistor (TFT) LCD panel.

7. The display apparatus of claim 1, wherein the image sensors each include a camera module.

8. The display apparatus of claim 1, wherein each of the image sensors is operable to capture a respective one of the plurality of images through the front panel.

9. The display apparatus of claim 8, further comprising a controller to synchronize the image sensors to capture the plurality of images through the front panel.

10. The display apparatus of claim 1, wherein the image sensors are located on a back panel.

11. The display apparatus of claim 10, wherein the back panel further includes a plurality of light emitting diodes (LEDs) for displaying the image to the first user.

12. The display apparatus of claim 11, wherein the image sensors are interspersed among the LEDs.

13. The display apparatus of claim 12, wherein the LEDs are configured in a matrix on the back panel, such that lattices exist between the LEDs.

14. The display apparatus of claim 13, wherein the image sensors occupy positions in at least a portion of the lattices existing between the LEDs.

15. The display apparatus of claim 11, further comprising a shutter situated between the front panel and the image sensors.

16. The display apparatus of claim 15, wherein the shutter is operable in a diffuse state to diffuse an illumination provided by the LEDs.

17. The display apparatus of claim 15, wherein the shutter is operable in a transparent state to allow the image sensors to capture the plurality of images through the front panel.

18. The display apparatus of claim 17, wherein the image sensors are operable to capture the plurality of images when the shutter is in the transparent state.

19. The display apparatus of claim 1, further including a controller operable to switch the display apparatus between a display state in which the front panel displays the image to the first user, and a camera state in which the image sensors situated behind the front panel capture the plurality of images of the first user through the front panel.

20. The display apparatus of claim 19, wherein the plurality of images are captured through the front panel at regular intervals between the display of image frames.

21. A method, comprising:
identifying a transparent state of a front panel utilized for displaying an image to a first user situated in front of the front panel;

capturing a plurality of images of the first user situated in front of the front panel utilizing a matrix of image sensors situated behind the front panel, in response to the identification of the transparent state;

identifying a point of view of a second user to which a single final image of the first user to be generated based on the plurality of captured images is to be displayed, wherein the point of view of the second user is identified from a remote system capturing an image of the second user;

tracing rays from the point of view of the second user through each of the image sensors to identify pixels of the images captured by the image sensors that coincide with the point of view of the second user; and generating the single final image of the first user using the identified pixels for display to the second user, such that the single final image of the first user is specific to the point of view of the second user.

22. A computer program product embodied on a non-transitory computer readable medium, comprising:
computer code for identifying a transparent state of a front panel utilized for displaying an image to a first user situated in front of the front panel;

computer code for capturing a plurality of images of the first user situated in front of the front panel utilizing a matrix of image sensors situated behind the front panel, in response to the identification of the transparent state;

identifying a point of view of a second user to which a single final image of the first user to be generated based on the plurality of captured images is to be displayed, wherein the point of view of the second user is identified from a remote system capturing an image of the second user;

tracing rays from the point of view of the second user through each of the image sensors to identify pixels of the images captured by the image sensors that coincide with the point of view of the second user; and computer code for the single final image of the first user using the identified pixels for display to the second user, such that the single final image of the first user is specific to the point of view of the second user.

* * * * *